United States Patent [19]

Leeds

[11] 3,713,865
[45] Jan. 30, 1973

[54] COMPOSITE PRODUCT AND METHOD OF MAKING SAME

[75] Inventor: Donald H. Leeds, Rolling Hills, Calif.

[73] Assignee: Ducommun Incorporated, Los Angeles, Calif.

[22] Filed: July 5, 1968

[21] Appl. No.: 742,543

[52] U.S. Cl. .............. 117/46 CC, 23/209.4, 106/43, 106/44, 106/56, 117/46 CG, 117/113, 117/160 A, 161/170, 252/504, 252/516, 264/29
[51] Int. Cl. .......................... C23c 11/08, B44d 1/02
[58] Field of Search ...... 117/62, 46, 113, 160 A, 106, 117/126 R, 42 CC, 46 CG; 106/56, 57, 43, 44; 23/209.4; 252/504, 516; 264/29

[56] References Cited

UNITED STATES PATENTS

| 3,187,502 | 6/1965 | Stover | 117/46 X |
|---|---|---|---|
| 3,208,872 | 9/1965 | Criss et al. | 117/106 X |
| 3,271,181 | 9/1966 | Jewell et al. | 117/62 X |
| 3,301,763 | 1/1967 | Beatty et al. | 117/46 X |
| 3,432,336 | 3/1969 | Langrod et al. | 117/46 X |
| 3,447,952 | 6/1969 | Hertl | 117/106 |
| 3,281,261 | 10/1966 | Lynch | 117/46 CC |
| 3,369,920 | 2/1968 | Bourdeau | 117/46 CG |
| 3,385,915 | 5/1968 | Hamling | 117/46 CC |
| 3,403,008 | 9/1968 | Hamling | 23/344 |

*Primary Examiner*—Edward G. Whitby
*Attorney*—Whann & McManigal

[57] ABSTRACT

A composite product and method of producing same having a substrate or matrix comprising carbonized fibers in which a metallic salt solution consisting of a soluble metal salt selected from a group consisting of Hf, Zr, Ta, Cb, W, Mo, Ti, V, Cr, Si, B, P and Pb, which form either carbides which are refractory or oxides which melt and are capable of forming a liquid surface (which will slow the diffusion of oxygen to the graphite surface causing either $C + 1/2O_2 \rightarrow CO$ or $C + O_2 \rightarrow CO_2$, depending upon the pressure and temperatures used in the end use). Said metallic salt when dissolved in a solvent of water or a solvent containing acetone, alcohol, ether or the like, is introduced into the interstices of the substrate and which after drying is left in fine particles. The composite is then heated to a temperature in the range of 1,500° to 2,500° F. with or without hydrogen atmosphere to effect partial reduction of the metallic salt. Almost simultaneously, carbon is infiltrated into the substrate to enclose the fibers and the metal particles. Subsequently the substrate is raised to a temperature of between approximately 1,400° C. and approximately 2,800° C. to anneal the pyrocarbon and convert the reduced metallic salt into carbide, thus producing a composition product having the substrate fibers surrounded by dead soft annealed graphite intimately mixed with hard carbide particles of very high melting point. The metal salt impregnated matrix, the reduced and/or not pyrocarbon coated metal salt in the matrix and the reduced, pyrocarbon coated, carbide converted metal salt or oxidized variations thereof are all referred to hereafter as alloys of the matrix.

40 Claims, No Drawings

COMPOSITE PRODUCT AND METHOD OF MAKING SAME

BACKGROUND OF THE INVENTION

In the various industries there is a need for composition materials which will withstand high temperatures and pressures, for example, rocket nozzles in the rocket industry which are subjected to high temperatures and pressures.

Applicant is familiar with the following patents which illustrate the inadequacy of the prior art:

| Patentee | No. | Issue Date |
|---|---|---|
| Voelker | 683,085 | Sept. 24, 1901 |
| Baker, et al. | 2,758,940 | Aug. 14, 1956 |
| Soltes | 3,011,981 | Dec. 5, 1961 |
| Dess | 3,100,688 | Aug. 13, 1963 |
| Ford | 3,121,050 | Feb. 11, 1964 |
| Gibson, et al. | 3,174,895 | Mar. 23, 1965 |
| Lynch | 3,281,261 | Oct. 25, 1966 |
| Noland, et al. | 3,301,742 | Jan. 31, 1967 |
| Alper, et al. | 3,340,076 | Sept. 5, 1967 |
| Alper, et al. | 3,340,077 | Sept. 5, 1967 |
| Alper, et al. | 3,340,078 | Sept. 5, 1967 |

SUMMARY OF THE INVENTION

My invention relates to composite materials capable of withstanding high temperatures and pressures and which may be produced in the form of a rigid or soft reinforced composite article, and to methods of making same, and to methods of impregnating a substrate with metal salts.

It is an object of my invention to provide a method and article in which a substrate is impregnated with metal salts and thereafter heated in a suitable atmosphere to convert the metal salts into the metal, its oxide, leave it as the salt or convert it to its carbide.

It is an object of my invention to provide a method and article or product wherein the carbide materials comprise fine particle size materials, which will withstand high temperatures or withstand high temperatures and or pressures and or severe skin friction shear conditions.

It is an object of my invention to provide a method and article or product wherein the metal or oxide materials comprise fine particle size materials, which will operate at high temperatures or high temperatures and or pressures and or severe skin friction sheer conditions.

It is an object of my invention to provide a method and composite material in which the substrate is formed of rayon, cotton, wool or other suitable fibrous material and which is impregnated with the metal salts before or after carbonization. The composite is then reduced and infiltrated with pyrolytic carbon, which may or may not be converted into the carbide.

It is a further object of my invention to provide a method and composite product, in which the infiltrated carbon fibers of the substrate or matrix, which may or may not be converted into graphite at the suitable density, are impregnated with metal salt, which is then dried.

It is a further object of my invention to provide a method and composite product in which the impregnated carbon fibers of the substrate or matrix are coated with pyrolytic material which, during the heat treatment, is converted into graphite so that the matrix, after impregnation with the salt which is subsequently reduced and either converted to the carbide or left as the metal, contains particles surrounded by dead soft annealed graphite.

It is an object of my invention to provide a composite product and method in which the fibers of the substrate are carbonized, the substrate is impregnated with metal salts which are dried to leave a mineral aggregate consisting of extremely dense fine particles of alloy coated with pyrocarbon and heat treated to convert the pyrolytic carbon or graphite and the alloy salts into carbide.

It is a still further object of my invention to provide the unique and novel method of forming the metal salt solution and impregnating the substrate therewith.

DESCRIPTION OF PREFERRED EMBODIMENTS OF MY INVENTIONS

In making the composite of my invention, in accordance with the methods of my invention, a suitable substrate is first formed and thereafter the various steps are performed on the matrix in order to manufacture the final composite product.

The Substrate or Matrix

The substrate of matrix is formed of rayon, cotton, wool or other fibrous material which is either inorganic and will remain without decomposition to a temperature where carbon infiltration is accomplished, which temperature is in the order of 2,000° F., or is organic and forms, without deforming or melting, a suitable carbon char.

This substrate may be made up of tape wound fibers or the fibers may be totally disoriented as in a felted material, or may even be in the form of a fabric.

My invention is particularly adapted for the making of objects or articles which must withstand very high tempertaures and is preferably practiced in a process wherein the substrate is performed into a matrix of the desired size and shape, for example, a nozzle for use in rockets.

In my process the matrix is impregnated with a soluble salt and this impregnation step may be performed on the raw formed matrix or raw substrate before it is carbonized, after it is carbonized, or after pyrolytic material has been deposited on the fibers or after the matrix has been reenforced by pyrolytic material applied to the carbonized fibers and heat treated.

The process which may be employed for carbonizing the fibers, applying and heat treating the pyrolytic material, is disclosed in the copending application of Williams and Warren for Reinforced Composite Materials, filed Aug. 27, 1965, Ser. No. 483,348, now abandoned.

The pyrolytic material is preferably pyrolytic carbon or graphite but, as pointed out in said application referred to above, may include pyrolytic material which may be deposited in vapor form including pyrolytic graphite, nitrides, such as boron nitride, refractory metals, such as tantalum, tungsten, molybdenum and columbium, as well as carbides, including tantalum carbide, niobium carbide, zirconium carbide, hafnium carbide and silicon carbide.

Impregnation with Soluble Salts

The matrix is impregnated with soluble salts of the elements of refractory material series or group consisting of Hf, Zr, Ta, Cb, W, Mo, Ti, V, Cr, Si, B, P, and Pb.

The qualities of these elements which make them suitable for use in my process are that they all form either refractory carbides or oxides which are (1) refractory, or, (2) melt and are capable of forming a liquid surface which will slow the diffusion of oxygen to the graphite surface which yields either $C + 1/2O_2 \rightarrow CO$ or $C + O_2 \rightarrow CO_2$, depending upon the pressures or temperatures in the end use, as will be explained later.

Numerous halogen compounds may be used. In the case of silicon and certain others, a salt must be chosen which is not in itself volatile. Such a salt could contain oxygen and decompose to the non-volatile oxide by heating, such as silicic acid which is soluble in ammoniacal solutions, or be capable of decomposing to the stable non-volatile oxide by chemical reaction, as is the case of the dilute alkali soluble sulfide in water. The matrix is then dried and brought into contact with water, after the solute has been deployed interstitially. The halogens must be soluble in a volatile polar or organic carrier.

The compound cannot sublimate but rather be capable ultimately of leaving the alloy element behind to be reduced on being heated. In the impregnating step the appropriate salt is dissolved in solvent at temperatures below the use temperatures of the composite or fabrication temperature to which graphite is formed. The appropriate salt must also be one which will dissolve in a volatile solvent so that one can easily get rid of the solvent without worry of residuals. Such solvents would include acetone, alchols, ether, etc.

The selected appropriate salt is dissolved in the solvent at room temperatures. In practice applicant has dissolved one gram of salt, such as Ta, Hf and Zr in 1 cm$^3$ of solvent. Also, applicant has dissolved 2 cm$^3$ of salt in 50 cm$^3$ of solvent for the amphoteric series materials. The matrix is submerged into the solution until air bubbles stop. The matrix is then over dried to remove the volatiles. 150° F. if found satisfactory for volatile organic solvents and 230° F. for water. Several cycles of submerging or saturating and drying may be used.

In this impregnating step the fibers of the matrix are not coated but the solute deposits as a concrete aggregation of fine particles (one-fourth to 20 microns) around the juncture of two or more fibers and in the interstices between the fibers. Several salts may be impregnated at one time in different ratios. For example, applicant has used solutions containing 80 parts of Ta to 20 parts of Hf. The carbide resulting from this solution is the highest melting substance at normal pressures known to man. The method referred to introduces the alloy in a soluble salt form (chlorides) completely dissolved in a volatile carrier (alcohol) thereby escaping the filtration effect of colloids and penetrating to the innermost interstices. There are innumerable solvents and solvent combinations which may be used. Applicant has worked chiefly with acetone, water and ethyl and methyl alcohol.

Where water is used as a solvent some difficulty is experienced in that the solution would not adequately wet the matrix or penetrate into the interstices. A small volume of acetone as a wetting agent may be added to a 50 percent by weight and volume solution of $H_2ZrO (SO_4)_2 \cdot 3H_2O$ and water. This solution temporarily precipitates the salt, but the salt will readily redissolve. This technique has not been used with compounds other than the carbonate and sulfate of zirconium. The solution percentage was varied from 10 to 50 percent by volume acetone and water. However, the range of workable possibilities is quite broad.

A second method to cause the solute rich solution to wet the carbon matrix is to first colloidally impregnate LiF into the matrix, whereafter the matrix is raised to a temperature in the order of 750° C. A solution of salts and water will then readily impregnate the matrix. LiF works because it reacts with surface carbon at the temperature referred to to form lithium carbide. This compound reacts with water to form a water soluble lithium hydroxide. This constitutes a chemical means of lowering the contact angle and improving wettability. Applicant has colloidally impregnated B, LiF, $ZrH_2$, Si and Cu. A particle size finer than 200 mesh usually 40 microns or less, is preferred. Infiltration with as fine as a half a micron and as coarse as 40 microns has been accomplished with these elements and compounds. A colloidal suspension is prepared by agitating fine particles in a volatile carrier such as acetone and the porous matrix is submerged into the liquid waiting for the bubbles to cease, removing the matrix to a drying or evaporator oven and repeating the process until the desired solids content is reached. This process yields a matrix which will release its impregnant on sharp impact, like a knock or a drop. Care must be exercised with the material until it has been infiltrated with pyrocarbon and internally coated which "locks in" the fine particles.

In drying off (particularly if the drying is done rapidly) the volatile carrier leaves the residue of salt which is very fine (one-fourth to 20 microns). The temperature is not critical and may range from 160° to 230° F. The lower number is a practical limit above which exposed element ovens can reach an explosive flash point with volatile organic carriers. The higher temperature is significantly above the 212° boiling point of water to readily remove the water from the matrix.

As stated, evaporation of the volatile carrier leaves salt in the interstices of the matrix. At intersections of fibers it is deposited in high percentages and along the fibers it is deposited in low weight percentage impregnations. The percentages will vary according to the matrix. When the larger fiber intersection interstices are filled, the material will deposit along the smaller openings which follow along the fibers, since this is the apparent pore path. When rayon is carbonized, fibers change from 20–25 microns in diameter to 10–15 microns. It is possible that this carbonization causes porosity and surface discontinuity sufficient to accept the salts as an impregnant.

At this point a partial reduction of salts is accomplished by elevating the temperature of the matrix and its impregnating salts in the presence of hydrogen. This is done by placing the matrix in a suitable oven. Partial reduction actually takes place at a temperature of from approximately 1,000° F. to approximately 2,500° F. The primary salt reduction happens in this temperature range, but does not necessarily go to completion at this temperature.

Forming of Carbide

The next step is to convert, in a separate furnace exposure, the alloys to carbides by elevating the temperature of the matrix to below or just at the carbide liquidus in a nitrogen atmosphere, where salt reduction is completed. This temperature is different for different alloying elements. The first liquidus in the tantalum-carbon system is at about 2,800° C.; in the zirconium-carbon system is at about 1,860° C.; in the hafnium-carbon system is at about 2,175° C.; in the tungsten-carbon system is at about 2,710° C.; in the molybdenum-carbon system is at about 2,200° C.; in the niobium-carbon system is at about 2,335° C.; in the titanium-carbon system is at about 1,750° C.; in the vanadium-carbon system is at about 1,735° C.; in the chrome-carbon system is at about 1,550° C. or less; in the silicon-carbon system is at about 1,402° C.; and in the boron-carbon system is at about 2,080° C. The time factor for significant carbide formation may range from about one-half hour to about 2 hours.

At temperatures above 2,600° C. for times of one-half hour or more, the carbon matrix will convert at least in part to graphite. If the alloy element requires this sort of temperature the change in the matrix will occur. If it does not, then there is the option to supply the alloy as containing carbide particles in either carbon or graphite matrix. Generally the graphite matrix will better absorb thermal stresses without fracture in a re-entry vehicle leading structure intended end use.

Forming Pyrocarbon Coating

An alternative procedure, and one which has been commercially practiced, is to, during the step of partial reduction of the salts, at that time coat the alloy and fibers individually with pyrocarbon, which keeps the alloy from reacting with the fibers in subsequent steps at elevated temperatures and which produces a final product in which the fine dense particles of carbide are surrounded by the dead soft annealed pyrocarbon or pyrographite.

This portion of the process is performed as follows: after impregnation with the metal salt solution and drying, the matrix is put into a furnace and the temperature is raised to 1,500° to 2,500° F. with a reducing atmosphere such as hydrogen for partial reduction. After the desired temperature has been reached methane gas is then introduced along with the hydrogen and at this point the hydrogen can represent from zero to 50 percent of the flow. The infiltration of pyrocarbon may be accomplished as explained in the copending Williams et al. application previously referred to.

The infiltration of methane permeates the hot matrix and plates pyrocarbon on the alloy particles and the fibers. If this is allowed to continue for 50 to 500 hours the porosity of the matrix will diminish and the piece will approach the theoretical density of carbon 2.05 g/cc.

Upon completion of this partial alloy reduction and pyrocarbon infiltration step, the method is then continued by heating to the temperatures which will produce carbide.

If the matrix is heated high enough either before impregnation or after impregnation of metal salts the pryocarbon will convert to graphite and will become dead soft, this usually occurring at temperatures in excess of 2,600° C. It is during the carbide forming step that the pyrocarbon is converted into dead soft graphite.

It is possible to supply the alloy as metal in carbon with no annealing; carbide in graphite, if the temperature is raised to greater than approximately 2,600° to 3,000° C., which will change the carbon into graphite; carbide in carbon, if the carbide liquidus temperature is below the carbon to graphite transition temperature; or metal or carbide in graphite, which can be achieved by heating the matrix before impregnation to 2,600° C. or greater, and thereafter impregnating with the metal salt solution as heretofore outlined.

Where the infiltration step is accomplished to a density of 10-15 lbs/ft$^3$ before the matrix has been impregnated and again afterwards the alloy elements will not react with the carbon of the fibers but will be eventually converted into carbide surrounded by pyrocarbon or pyrographite.

EXAMPLE 1

A 2 inch ×2 inch ×4 inch sample of 20 lbs/ft$^3$ was used as the substrate in this test. This sample is referred to as "RPG" and consists of a fibrous body of rayon in which the fibers had been carbonized and infiltrated with pyrocarbon. This sample was impregnated with HfCl$_4$ and methyl alcohol solution in proportions of one gram to one cm$^3$ by dipping, drying at 70° C. in an oven and redipping and redrying until the weight pick-up diminished below 10 w/o. The sample was machined into a hemispherical cone, then placed in a furnace at 1,800° F. and 14 mm Hg vacuum and infiltrated with CH$_4$ for 120 hours, which reduced the metal salt and infiltrated the body with pyrolytic carbon surrounding both the carbon fibers and impregnant particles.

At this point a fine machining removed 0.001 inch from the surface and the sample was again infiltrated with pyrolytic carbon until a density of 2.03 g/cc was achieved. This sample was tested in a typical reentry thermal environment at 70 atmospheres pressure and performed excellently, showing a minimum of erosion.

This sample was then remachined and further heat treated at 2,500 C. to drive some carbon into solid solution with the hafnium. The sample thus treated thereupon became an example of molecularly impregnated metal in a carbon matrix.

EXAMPLE 2

Three samples of "RPG" matrix or substrate 2½ inches ×5 inches ×¾ inch plates at 17 lbs/ft$^3$ density were individually impregnated, one with zirconium sulfate, the second with hafnium chloride, and the third with tantalum chloride. Pyrolytic carbon was then infiltrated into each of the samples to maximum density, namely, in the area of 2.03 g/cc. The tantalum impregnated sample was heat treated to the range of 3,000° to 3,200° C. and the zirconium and hafnium impregnated samples were heat treated to about 2,600° to 2,800° C. The heat treatment was long enough to transform the carbon matrix into graphite and create the carbides from the metal salts.

EXAMPLE 3

Samples of "RPG" matrix 2 inches ×2 inches ×¼ inch at 20 to 25 lbs/ft$^3$ were heat treated to 3,000° C. for 2 hours which transformed the carbon "RPG" to graphite. Hafnium chloride was then impregnated into the samples by the method previously described and the samples were then surface machined, after which pyrocarbon was infiltrated to maximum density of about 2.03 g/cc. The samples were then heated in hydrogen to a 1,850° F. deposition temperature to reduce the chloride to metal. This produced a composite product of molecularly impregnated metal in a graphite matrix. The molecular technique showed a very uniform distribution of metal throughout the samples.

EXAMPLE 4

Samples of 90 lbs/ft³ graphitized "RPG" 3 inches ×3 inches ×2 inches were impregnated with basic lead acetate methyl alchohol solution one part by weight of solute to one part by volume of solvent and dipped until the weight pick-up diminished below 10 w/o. The sample was then subjected to 1,850° F. static air furnace oxidation tests. The end use in mind was for high temperature bearing surface (to 1,900° F.) in a planned supersonic transport.

EXAMPLE 5

Samples of 20 lbs/ft³ density "RPG" three-eighths inch wide by one-eight inch thick by 3 inches long (standard flexural test specimen size) and one-half diameter ×1 inches long (standard compression test specimen) were impregnated with −325 mesh (40 microns) silicon metal suspended in acetone. Samples were impregnated with colloidal silicon until the weight pick-up was less than 10 percent. Impregnated samples were then infiltrated with pyrolytic carbon at 1,950° F. and 40 mm of mercury pressure until density increased to 1.8 to 1.9 g/cc. At this point the temperature was increased to 3,100° F. and held for 2 hours. Under these conditions silicon carbide was formed. This yielded high mechanical properties as compared to the "RPG" without silicon. End use for this application is in the high speed grinding and electrolytic grinding wheel industry.

EXAMPLE 6

Two samples 5 inches ×2½ inches ×½ inches thick, each of 15 lbs/ft³ density "RPG" were impregnated with zirconium sulfate water-acetone solution, dried, and infiltrated with pyrolytic carbon to 1.8 to 1.9 g/cc density. Samples were then heat treated to 2,800° C. for 1½ hours. At this temperature the zirconium was converted to zirconium carbide and the carbon matrix was converted to graphite. This would be another example of carbide material in a graphite matrix. The end use in this case was for nuclear shielding for space space application.

Applicant, by reciting the foregoing preferred forms of his invention, does not intend to be limited to specific details recited in the preceding descriptions, but desired that the invention be construed in accordance with the appended claims and to cover all mechanical equivalents.

I claim:
1. A composite product comprising:
   a. a carbonized fibrous substrate; and
   b. small particles of carbide in the interstices between said carbonized fibers and around the juncture of two or more fibers.

2. A composite product as defined in claim 1 in which the small particles of carbide are formed from a metal salt selected from a group consisting of Hf, Zr, Ta, Cb, W, Mo, Ti, V, Cr, Si, and B.

3. A composite product as defined in claim 1 in which dead soft annealed pyrolytic carbon surrounds said carbonized fibers and said particles of carbide.

4. A method of forming a composite product comprising:
   a. introducing a metallic salt solution between carbonized fibers of a substrate;
   b. drying out said solution to leave alloy particles in the interstices between the carbonized fibers and around the juncture of two or more fibers; and
   c. heating the substrate in a reducing atmosphere to temperatures of between approximately 1,000° and 2,500°F. to reduce said alloy particles.

5. A method as defined in claim 4 in which after the reducing step the substrate and its impregnate is infiltrated with pyrolytic carbon and then is heated to a temperature of between 1,400° to 2,800° in an inert atmosphere to convert the alloy particles into carbide.

6. A method as defined in claim 5 in which said metallic salt solution is a metallic sulfate.

7. A method of forming a composite product as defined in claim 4 in which the metal salt solution consists of a metal selected from a group consisting of Hf, Zr, Ta, Cb, W, Mo, Ti, V, Si, and B, and a solvent from the group consisting of water, acetone, ethyl and methyl alcohol, ether and equivalent volatile solvent liquids.

8. A method of forming a composite product as defined in claim 4 in which the metal salt solution consists of a metal salt selected from a group of metal salts and a solvent having the properties of forming refractory carbides or oxides which are refractory or melt and are capable of forming a liquid surface which will slow the diffusion of oxygen to the carbon surface, said metal salt selected from a group consisting of Hf. Zr, Ta, Cb, W, Mo, Ti, V, Cr, Si, B, P And Pb.

9. A method as defined in claim 4 in which said metallic salt solution is a metallic sulfate.

10. A method as defined in claim 4 in which said reducing atmosphere is hydrogen.

11. A method as defined in claim 4 in which said reducing atmosphere is methane.

12. The method as defined in claim 4 in which the carbonized fibers of the substrate are converted into graphite before impregnation with the salt, and thereafter the salt is reduced to the metal and pyrocarbon is infiltrated into the composite.

13. A method of forming a composite product as defined in claim 4 in which the carbonized fibers and metal salt are surrounded with pyrocarbon prior to converting the metal salts into carbide.

14. A method of forming a composite product as defined in claim 4 in which the substrate is heated in an atmosphere containing methane or the equivalent to a temperature of between 1,500° and 2,500°F. in order to infiltrate pyrocarbon into the substrate around the carbonized fibers and metal salt particles before the alloy is converted into carbide.

15. A method of forming a composite product as defined in claim 4 in which the metal salt solution consists of a metal salt selected from a group of metal salts and a solvent having the properties of forming refractory carbides or oxides which are refractory or melt and are capable of forming a liquid surface which will slow the diffusion of oxygen to the carbon surface which yields either $C + 1/2 O_2 \rightarrow CO$ or $C + O_2 \rightarrow CO_2$.

16. A method of forming a composite product as defined in claim 4 in which the metal salt solution consisting of a metal salt selected from a group consisting of Hf, Zr, Ta, Cb, W, Mo, Ti, V, Cr, Si, and B, and a solvent including acetone.

17. A method of forming a composite produce as defined in claim 4 in which the metal salt solution consisting of a metal salt selected from a group consisting of Hf, Zr, Ta, Cb, W Mo, Ti, V, Cr, Si, and B, and a solvent including ethyl or methyl alcohol.

18. A method of forming a composite product as defined in claim 4 which the metal salt solution consisting of a metal salt selected from a group consisting of Hf, Zr, Ta, Cb, W, Mo, Ti, V, Cr, Si, and B, and a solvent including water.

19. A method of forming a composite product as defined in claim 4 in which the metal salt solution consisting of a metal salt selected from a group consisting of Hf, Zr, Ta, Cb, W, Mo, Ti, V, Cr, Si, and B, and a solvent elected from a group consisting of water, acetone, alcohols, ether and equivalent volatile solvent liquids.

20. A method of forming a composite product as defined in claim 4 in which the substrate consists of fibers of rayon and in which the fibers are either carbonized before impregnation by the metal salt solution or are carbonized afterwards.

21. A method of forming a composite product as defined in claim 4 in which the substrate consists of fibers selected from a group consisting of rayon, cotton, wool or other fibrous material, which is either inorganic and will remain without decomposition to a temperature where carbon infiltration is accomplished, or is organic and forms, without deforming or melting a suitable carbon char.

22. A composite product as defined in claim 2 in which the metal salt is Ta.

23. A composite product as defined in claim 2 in which the metal salt is Cb.

24. A composite product as defined in claim 2 in which the metal salt is Zr.

25. A composite product as defined in claim 2 in which the metal salt is Si.

26. A method of forming a composite product comprising:
 a. introducing a metallic salt solution between carbonized fibers of a substrate;
 b. drying out said solution to leave small alloy particles in the interstices of the carbonized fiber;
 c. heating the substrate and its impregnant to temperatures of 1,500° to 2,500°F. in hydrogen; and
 d. depositing pyrolytic carbon around said fibrous substrate and impregnant particles without converting them significantly to carbide.

27. A method of impregnating a carbonized fibrous substrate comprising:
 a. forming a metal salt solution from a metal salt selected from a group consisting of Hf, Zr, Ta, Cb, W, Mo, Ti, V, Cr, Si, B, P and Pb, and a solvent; and
 b. introducing the solution into the interstices the carbonized fibrous substrate.

28. A method of impregnating a carbonized fibrous substrate comprising:
 a. forming a metal salt solution from a metal salt selected from a group consisting of Hf, Zr, Ta, Cb, W, Mo, Ti, V, Cr, Si, B, P and Pb, and a solvent selected from a group consisting of water, acetone, alcohols, ether and equivalent liquids; and
 b. introducing the solution into the interstices between the carbonized fibrous substrate.

29. A method of increasing the impregnant solute solution system liquid wettability of carbon or graphite fibrous matrices comprising;
 a. colloidally impregnating the matrix with a compound which will chemically react with the carbon or graphite matrix at elevated temperatures to form a solvent soluble compound, such as LiF in carbon or graphite heated to 750°; and
 b. additions to the solvent-solute system of miscible liquids which wet the graphite or carbon surface, such as the addition of acetone to a water zirconium sulfate solution.

30. A composite product comprising:
 a. a substrate having carbonized fibers;
 b. metal alloy particles in the interstices of said fibers, said metal alloy being formed of a metal salt selected from a group consisting of Ta, Cb, Zr, Si an Pb; and
 c. pyrolytic carbon surrounding said particles and said fibers.

31. A composite product as defined in claim 30 in which the fibers of said substrate are graphite.

32 A composite product comprising:
 a. a substrate having carbonized fibers;
 b. carbide particles in the interstices of said carbonized fibers, said carbide being formed of a metal salt selected from a group consisting of Ta, Cb, Zr, and Si; and
 c. pyrolytic carbon surrounding said particles and said carbonized fibers.

33. A composite product comprising:
 a. a substrate having carbonized fibers;
 b. particles of carbide in the interstices of said carbonized fibers; and
 c. pyrolytic carbon surrounding said carbonized fibers and said carbide particles.

34. A composite product comprising:
 a. a substrate having carbonized fibers infiltrated with pyrocarbon; and
 b. small particles of metal salt distributed throughout the substrate between the fibers of the substrate, said metal salt being selected from a group consisting of Hf, Zr, Ta, Cb, W, Mo, Ti, V, Cr, Si, B, P and Pb.

35. A composite product comprising:
 a. a substrate having carbonized fibers infiltrated with pyrocarbon which has subsequently been graphitized; and
 b. particles of metal salt distributed throughout the substrate between the fibers of the substrate said metal salt being selected from a group consisting of Hf, Zr, Ta, Cb, W, Mo, Ti, V, Cr, Si, B, P and Pb.

36. A method of forming a composite product comprising:
 a. heating a substrate having carbonized fibers to temperatures of 1,500° to 2,500°F;

b. infiltrating hydrocarbon gas into said substrate to coat said carbonized fibers with pyrolytic carbon;

c. introducing a metallic salt solution between the fibers of said substrate, said metallic salt solution consisting of a solvent and a metal salt selected from a group consisting of Hf, Zr, Cb, W, Mo, Ti, V, Cr, Si, B, P and Pb; and d. drying out said metallic salt solution at a temperature of about 60°C to 100°C to leave alloy particles in the interstices of the fibers.

37. A method of forming a composite product comprising:

a. heating a substrate having carbonized fibers to temperatures of 1,500° to 2,500°F;

b. infiltrating hydrocarbon gas into said substrate to coat said carbonized fibers with pyrolytic carbon;

c. annealing the infiltrated substrate to convert the carbonized fibers and the pyrolytic carbon coating to graphite;

d. introducing a metallic salt solution between the fibers of said substrate, said metallic salt solution consisting of a solvent and a metal salt selected from a group consisting of Hf, Zr, Ta, Cb, W, Mo, Ti, V, Cr, Si, B, P and Pb; and e. drying out said metallic salt solution at a temperature of about 60°C to 110°C to leave alloy particles in the interstices of the fibers.

38. A method of forming a composite product comprising:

a. introducing a metallic particle suspension solution between carbonized fibers of a substrate;

b. drying out said solution to leave small metal particles in the interstices of the carbonized fibers; and c. infiltrating the substrate with pyrolytic carbon to encapsulate the metal particles and tie them to the fibrous substrate.

39. A method as defined in claim 38 in which after the infiltration step the substrate is heat treated to convert the metal particles to carbide.

40. A method of forming a composite product comprising:

a. introducing a metallic particle suspension solution between carbonized fibers of a substrate; and b. drying out said solution to leave small metal particles in the interstices between the carbonized fibers and around the juncture of two or more fibers.

* * * * *